United States Patent
Faerber et al.

(10) Patent No.: US 8,388,051 B2
(45) Date of Patent: Mar. 5, 2013

(54) SUN ROOF HAVING CARRIAGE ELEMENT

(75) Inventors: Manfred Faerber, Wielenbach (DE);
Robert Birndorfer, Weilheim (DE);
Martin Pollak, Puchheim (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 13/131,839

(22) PCT Filed: Dec. 10, 2009

(86) PCT No.: PCT/DE2009/001748
§ 371 (c)(1),
(2), (4) Date: Jun. 29, 2011

(87) PCT Pub. No.: WO2010/081448
PCT Pub. Date: Jul. 22, 2010

(65) Prior Publication Data
US 2011/0260504 A1    Oct. 27, 2011

(30) Foreign Application Priority Data
Jan. 19, 2009    (DE) .................... 10 2009 005 133

(51) Int. Cl.
*B60J 7/057* (2006.01)
(52) U.S. Cl. .................... 296/216.08; 296/223
(58) Field of Classification Search ............ 296/216.06–216.08, 223
See application file for complete search history.

(56) References Cited

U.S. PATENT DOCUMENTS

| | | | | |
|---|---|---|---|---|
| 3,913,306 | A * | 10/1975 | Schumacher et al. | 56/313 |
| 4,364,601 | A * | 12/1982 | Katayama et al. | 296/221 |
| 6,364,406 | B1 * | 4/2002 | Leonardus Hermsen et al. | 296/214 |
| 6,695,398 | B2 | 2/2004 | Racine et al. | |
| 7,537,278 | B2 | 5/2009 | Seifert et al. | |
| 2004/0068839 | A1 * | 4/2004 | Hock et al. | 16/215 |

FOREIGN PATENT DOCUMENTS

| | | |
|---|---|---|
| DE | 102004037797 B3 | 12/2005 |
| DE | 202007004235 U1 | 5/2007 |
| DE | 102007004258 A1 | 7/2008 |
| DE | 102007021005 A1 | 12/2008 |
| FR | 2645803 A1 | 10/1990 |

OTHER PUBLICATIONS

International Search Report for PCT/DE2009/001748 dated May 3, 2010.

* cited by examiner

*Primary Examiner* — Dennis Pedder
(74) *Attorney, Agent, or Firm* — Marshall, Gerstein & Borun LLP

(57) ABSTRACT

A vehicle roof comprising at least one cover element, which selectively closes or at least partially exposes a roof opening and which, with respect to the vehicle longitudinal center plane, comprises a carrier element on either side, said carrier element being provided with a gate and interacting with an adjusting device, which is guided in a guide rail arranged in the vehicle longitudinal direction and comprises a carriage element, which interacts with the gate of the respective carrier element at least in order to pivot the cover element and comprises a guide section on which the carrier element rests. The guide section is formed by a wall of a plastic component, which can be elastically deformed and give way in a hollow space formed by the plastic component.

13 Claims, 16 Drawing Sheets

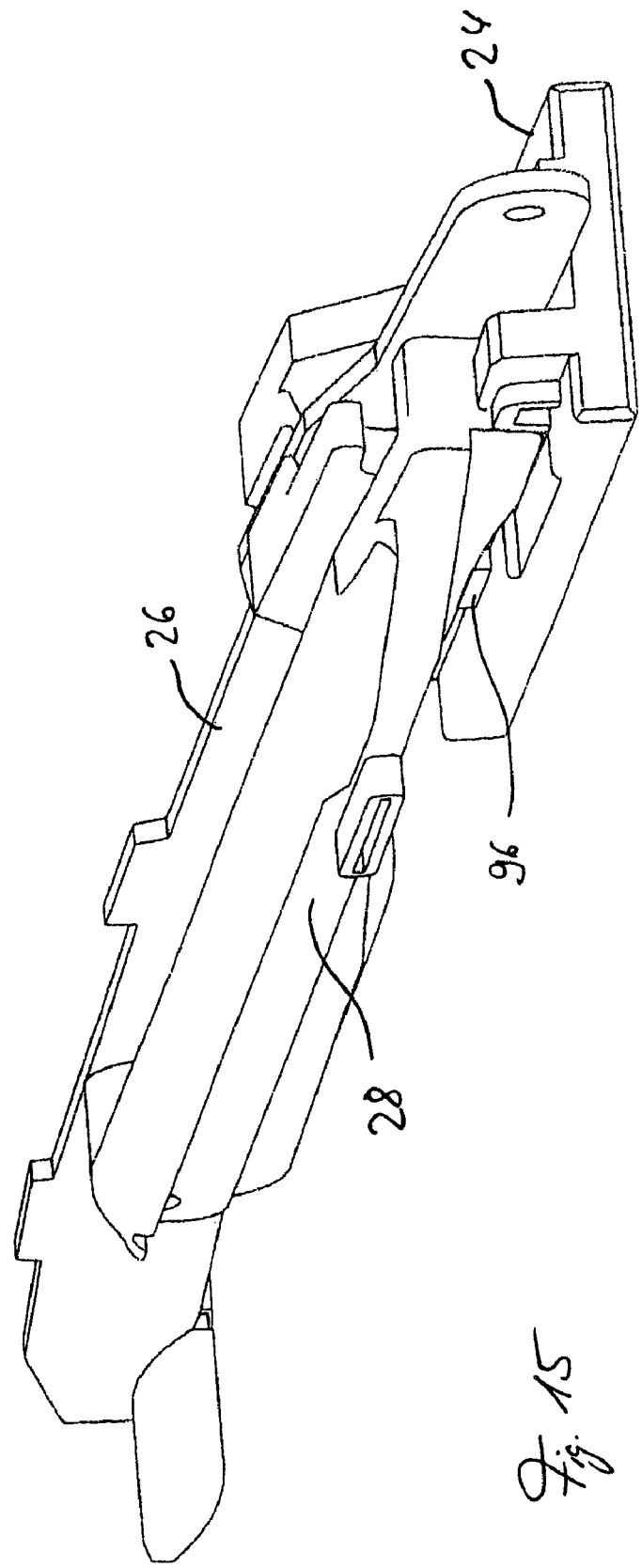

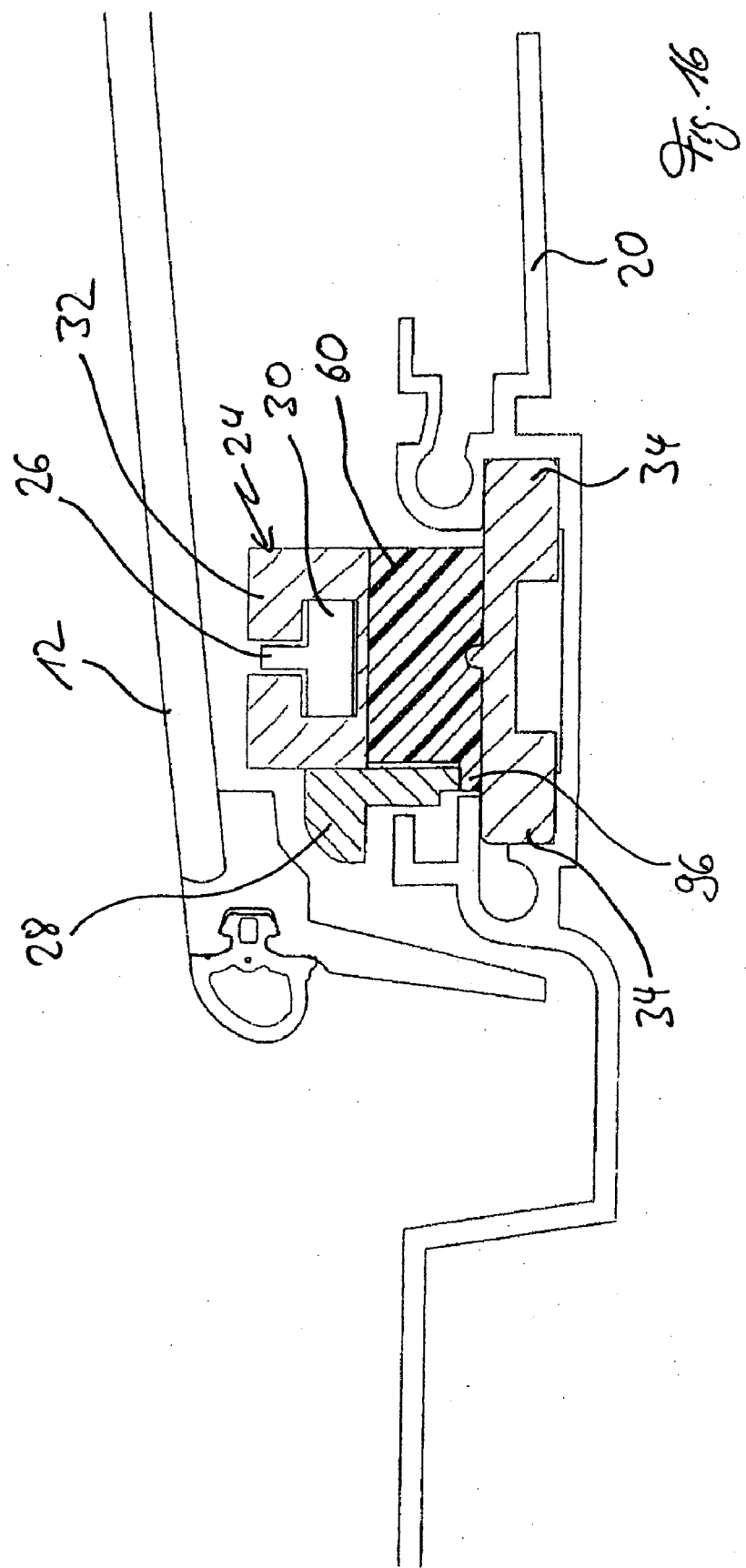

SUN ROOF HAVING CARRIAGE ELEMENT

BACKGROUND OF THE INVENTION

1. Field of the Invention

The invention relates to a vehicle roof with at least one cover element which optionally closes or at least partially opens up a roof opening.

2. Related Technology

A vehicle roof of this type is known, for example, from U.S. Pat. No. 6,695,398 B2 and comprises a cover element which, along both lateral edges thereof with respect to the vehicle longitudinal center plane, is provided with a carrier element which constitutes a pivoting or deployment arm. Guide rails, in each of which one of the carrier elements is displaceably guided, are arranged along the lateral edges of the roof opening. The carrier elements each interact with an adjustment device which comprises a carriage element which is provided with a claw which interacts with a guide track or control track of the particular carrier element. Movement of the carriage elements in the guide rails triggers a pivoting movement of the carrier elements and therefore of the cover element.

Furthermore, it is known from practice, in the case of carriage elements according to the type described above, to form a guide section on which the lower side of the particular carrier element rests and which consists of an elastically mounted steel roller which is formed from a rolling bearing steel tube in which a damper forming the elastic mounting is embedded. Such a guide section which is formed from a steel roller is also highly cost-intensive. Adequate compensation for tolerances in the vertical direction of the vehicle may possibly not be possible because of the small dimensions of the damper. Also, high surface pressure prevails because of the linear contact, which is predetermined by the steel roller, with the guide web formed on the particular carrier element. This may in turn lead, when the adjustment device is actuated, to undesirable noises occurring because of the "stick-slip effect".

SUMMARY OF THE INVENTION

The invention provides a vehicle roof of the generic type mentioned which above that is distinguished by favorable production costs with optimized compensation for tolerances of the carriage element.

Accordingly, the invention provides a vehicle roof with at least one cover element that optionally closes or at least partially opens up a roof opening which has a carrier element on both sides with respect to the vehicle longitudinal center plane, the carrier element being provided with a guide link and interacting with an adjustment device that is guided in a guide rail arranged in the longitudinal direction of the vehicle and comprises a carriage element that interacts with the guide link of the particular carrier element, at least for pivoting the cover element, and comprises a guide section on which the carrier element rests, wherein the guide section is formed by a wall of a plastic structural member, which wall can yield in an elastically deformable manner into a cavity formed by the plastic structural member.

The core of the invention consequently consists in that the guide section is formed by a wall of a plastic structural member, which wall can yield in an elastically deformable manner into a cavity formed by the plastic structural member. The guide section is consequently formed by a structural member which can be produced cost-effectively and, with the wall thereof bearing against the carrier element, forms a sliding surface which can be designed in an optimized manner with regard to the respective kinematic requirements. The guide section formed by the wall of the plastic structural member can in particular form a contact surface, leading to optimized sliding properties between the particular carrier element and the carriage element. However, it is also conceivable for the guide section formed by the wall to bear against the relevant carrier element via a contact line.

In a particularly cost-effectively producible embodiment of the vehicle roof according to the invention, the carriage element is a plastic injection molded part. In contrast to carriage elements according to the prior art, which elements are produced from painted steel, an increased variability with regard to the shaping of the carriage element is thereby also possible.

In a preferred embodiment of the vehicle according to the invention, the plastic part which has the wall forming the guide section is formed integrally with the carriage element. The guide section and the carriage element are therefore produced in a shaping process without further assembly steps.

In order to be able to confer respectively optimized properties on the carriage element in the various functional regions thereof, it may be advantageous to design the carriage element as a two-component injection molded part, wherein a carriage element body is formed by a first plastic component, and the plastic structural member which has the wall forming the guide section is formed by a second plastic component. A claw section engaging over the guide link or the guide web can also be formed from the second plastic component which, in cooperation with the material of the insert molding of the guide web of the carrier element, forms an optimized sliding pairing.

In an alternative embodiment of the vehicle roof according to the invention, the plastic structural member is an insert of a body of the carriage element. The carriage element therefore then has a carriage element body which is provided with a recess for receiving the plastic structural member which has the wall forming the guide section.

In the two-part embodiment consisting of the carriage element body and plastic structural member, the plastic structural member is preferably latched to the carriage element body and is therefore connected captively to the latter.

However, it is also conceivable for the plastic structural member to be inserted loosely into the recess in the carriage element body and then to be supported, for example, with a base surface on the guide rail and to be guided at right angles to the base surface in the recess.

In order to prestress that wall of the plastic structural member which forms the guide section in the direction of the carrier element and also to damp the forces introduced into said wall by the carrier element, in a special embodiment of the vehicle roof according to the invention, an elastically deformable damping element, on which the wall forming the guide section is supported, is arranged in the cavity. The damping element is manufactured, for example, from a spring-elastic plastic, such as EPDM, TPE, NBR or the like.

In order to increase the prestressing of the wall forming the guide section in the vertical direction, i.e. in the direction of the relevant carrier element, that side of the damping element which bears against the wall forming the guide section can be of curved design transversely with respect to the extent of the guide rail.

To secure the damping element in the cavity, the carriage element can have a projection which engages in a cutout in the damping element and holds the latter in position.

An expedient embodiment of the carriage element has a lateral opening for the insertion of the damping element, said opening leading to the cavity which is bounded by the wall forming the guide surface.

The damping element can protrude out of the lateral opening in the carriage element in order to form a rest surface, which in particular is also a damping surface and therefore counteracts annoying noises, for an otherwise customary locking lever of the control mechanism.

In order to increase the prestressing of that wall of the plastic part which acts on the carrier element, said wall can be of curved design at least on one side transversely with respect to the extent of the carrier element. For example, that surface of the wall which faces the cavity or else the surface facing the carrier element is curved transversely with respect to the extent of the carrier element.

In a further alternative embodiment of the vehicle roof according to the invention, the guide web of the carrier has an operative surface which bears against the guide section and is curved in the transverse direction such that prestressing is also applied here as compensation for tolerances in the vertical direction of the vehicle, and the forces introduced are introduced into adjacent structural members with a reduction in stress.

For the optimized adaptation of the guide section to the various adjustment regions of the relevant carrier element, the guide section is preferably formed by two guide surfaces which are each assigned to a pivoting phase of the cover element, are tilted with respect to each other and are arranged consecutively in the longitudinal direction of the guide rail.

Furthermore, it may be expedient for the wall forming the guide section to be of double-walled design. The two individual walls of the double wall can be connected to each other via transverse webs.

By forming the carriage element as a plastic injection molded part, it is possible to form spring tabs integrally thereon, said spring tabs, in assigned guide tracks of the respective guide rails, bearing against a guide track wall.

The invention also has a vehicle roof with at least one cover element which optionally closes or at least partially opens up a roof opening which has a carrier element on both sides with respect to the vehicle longitudinal center plane, said carrier element being provided with a guide link and interacting with an adjustment device. The adjustment device is guided in a guide rail arranged in the longitudinal direction of the vehicle and comprises a carriage element which interacts with the guide link of the particular carrier element, at least for pivoting the cover element, and comprises a guide section on which the carrier element rests. The carriage element is supported on the relevant guide rail via a centrally arranged spring on the underside. Upon occurrence of high forces in the vertical direction of the vehicle, said spring can introduce the forces directly into the guide rail. Said spring, which rests on the guide rail outside guide tracks for sliding elements of the carriage element, can replace springs which could otherwise be formed on the sliding elements and act in the vertical direction of the vehicle.

The spring is, for example, a leaf spring which bears against a sliding surface of the guide rail via a sliding section, said sliding surface lying between guide tracks of the guide rail, in which the lateral sliding elements of the carriage element are guided.

The spring is expediently designed as an insert of the carriage element which may be inserted during the production of the carriage element or else may be inserted retrospectively into a slot in the carriage element. However, it is also conceivable to design the spring from plastic and to form the spring integrally during the production of the carriage element which is designed in particular as an injection molded structural member.

Further advantages and advantageous refinements of the subject matter of the invention can be gathered from the description, the drawing and the patent claims.

BRIEF DESCRIPTION OF THE DRAWINGS

Exemplary embodiments of a vehicle roof according to the invention are illustrated in a schematically simplified manner in the drawing and are explained in more detail in the description below. In the drawing:

FIG. 15 shows the variant embodiment, which is illustrated in FIG. 14, for the lowered displacement position of the cover element; and FIG. 16 shows a section of the adjustment mechanism inserted into a guide rail, according to FIGS. 14 and 15.

DETAILED DESCRIPTION

Figure 1:
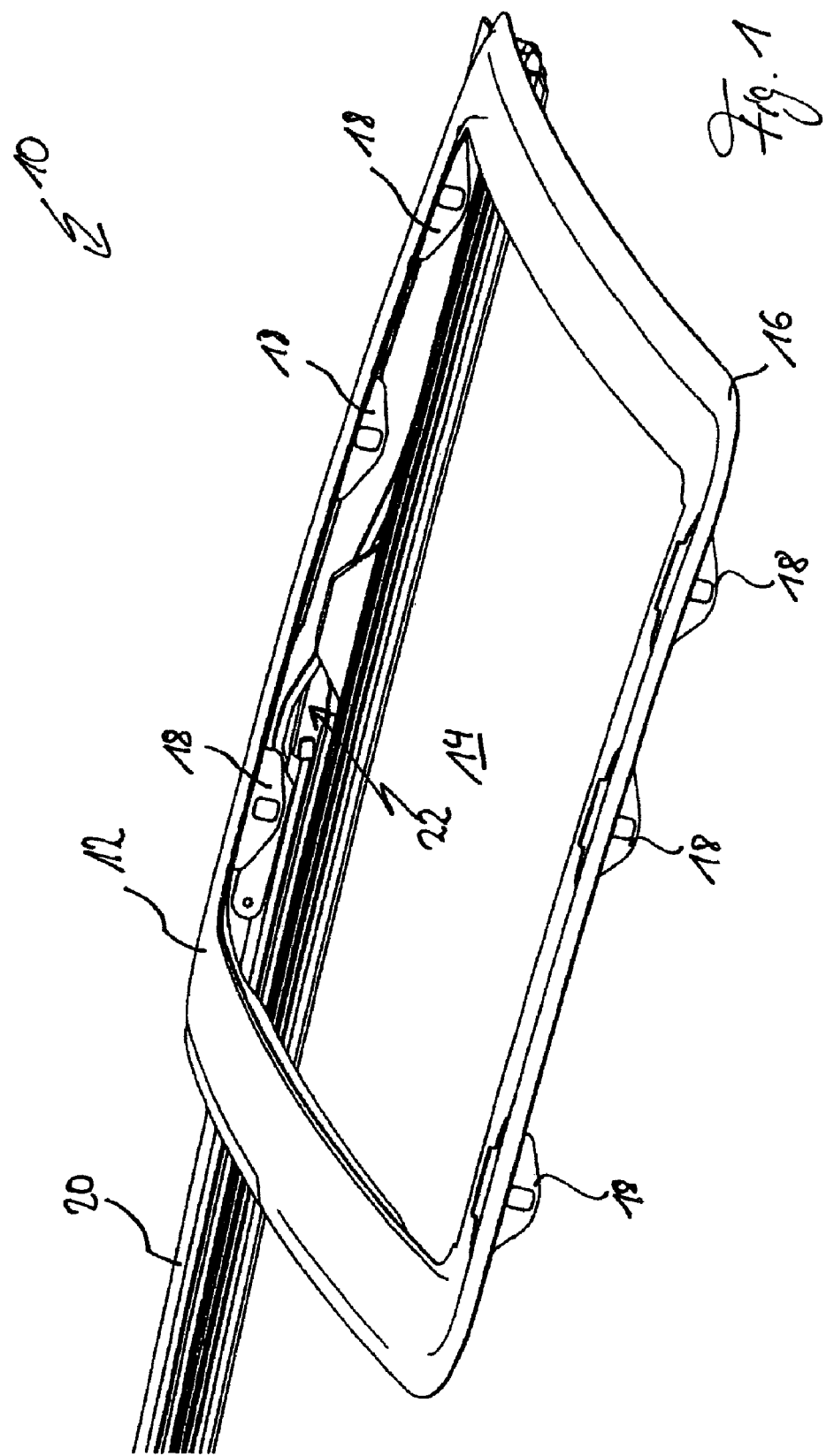
FIG. 1 shows an overview illustration of a cover element, which is guided in guide rails, of a tilt and slide sun roof.

FIG. 1 illustrates a tilt and slide sun roof 10 which is designed for insertion into a motor vehicle roof (not illustrated specifically) and has a cover element 12 by means of which a roof opening can optionally be closed or at least partially opened up. The cover element 12 has a glass body 14 which is enclosed by a frame 16 which is formed from a polyurethane foam and in which fastening tabs 18 are attached along the lateral edges with respect to a vehicle longitudinal center plane. The fastening tabs 18 serve to connect the cover element 12 to an adjustment device 22 for the actuation of the cover element 12, said adjustment device being guided in guide rails 20 arranged along the roof opening. For the sake of clarity, FIG. 1 illustrates only the adjustment device 22 which is arranged on the left in the forward direction of travel, together with the associated guide rail 20.

The adjustment device 22, which is illustrated in detail in FIGS. 2 to 9, comprises a drive carriage 24, which is movable in the guide rail 20 by means of a pressure-resistant drive cable (not illustrated specifically), a carrier element 26 to which the cover element 12 is screwed via the fastening tabs 18, and a locking lever 28, by means of which the position of the cover element 12 can be secured in the longitudinal direction of the vehicle and, for these purposes, interacts via a projection with a "garage" of the guide rail.

Figure 2:
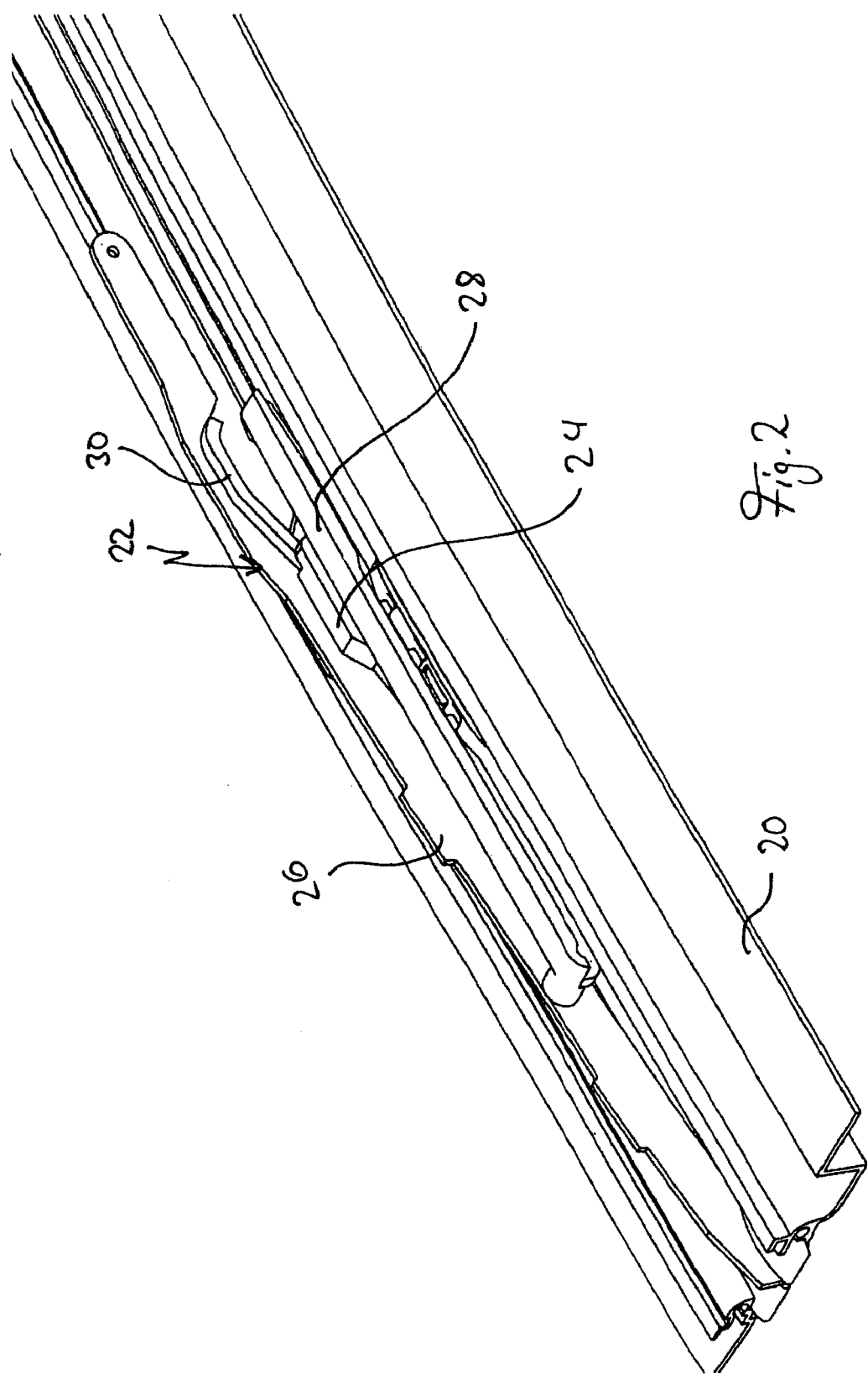
FIG. 2 shows an adjustment device, which is guided in a guide rail, for the cover element, in the closed position of the cover element.
Figure 3:
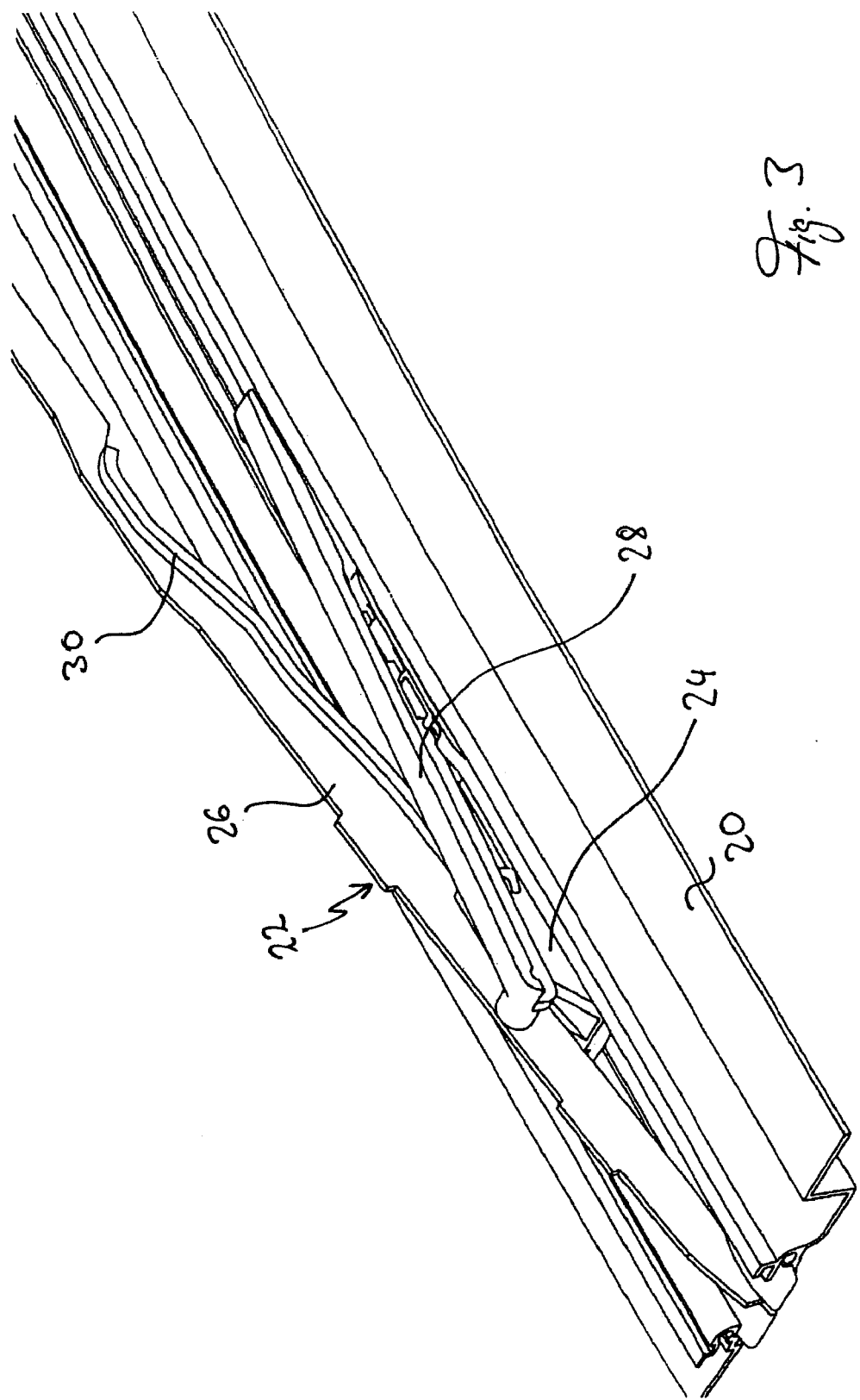
FIG. 3 shows a view corresponding to FIG. 2, but in the ventilation position of the cover element.
Figure 4:
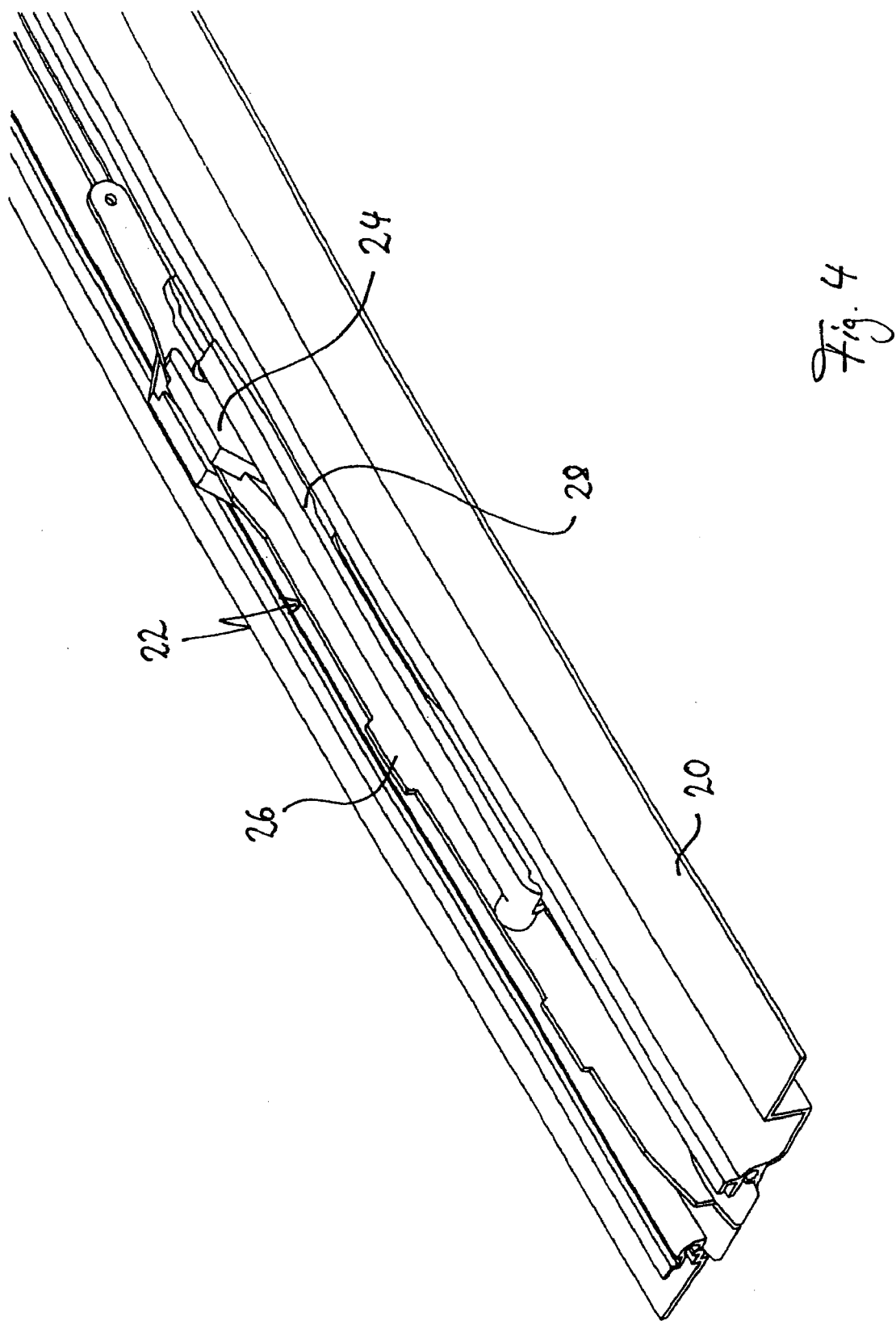
FIG. 4 shows a view of the adjustment device, likewise corresponding to FIG. 2, but for a lowered displacement position of the cover element.

By means of the adjustment device 22 illustrated in the present case, the cover element 12 can be pivoted between a closed position, which is illustrated with reference to FIGS. 1 and 2, a ventilation position which is illustrated with reference to FIG. 3, and a lowered displacement position, which is illustrated with reference to FIG. 4 and in which the cover element 12 is movable in the longitudinal direction of the vehicle. In the closed position illustrated in FIG. 2, the cover element completely covers the roof opening. In the ventilation position illustrated in FIG. 3, the rear edge of the cover element 12 is raised above the level of a rear, fixed roof region. In the lowered position illustrated with reference to FIG. 4, the cover element 12 is lowered into a "displacement position" in which it can move under a rear, fixed roof region.

The adjustment device which is arranged on the right in the direction of travel and to which the cover element 12 is attached via its fastening tabs 18, which are formed on the right-hand edge, is designed mirror-symmetrically to the adjustment device illustrated on the left in the direction of travel in the drawing and is therefore not explained in more detail.

The carrier element 26 is formed from a punched sheet and constitutes a pivoting or deployment arm for the cover element 12. The lower edge of the carrier element 26 has a substantially T-shaped guide web 30 which serves as a guide link, has a substantially downwardly sloping profile, as viewed from the vehicle rear, and interacts with the drive carriage 24. The guide web 30 is insert molded with an insert molding made from a plastic having favorable sliding properties.

Figure 5:
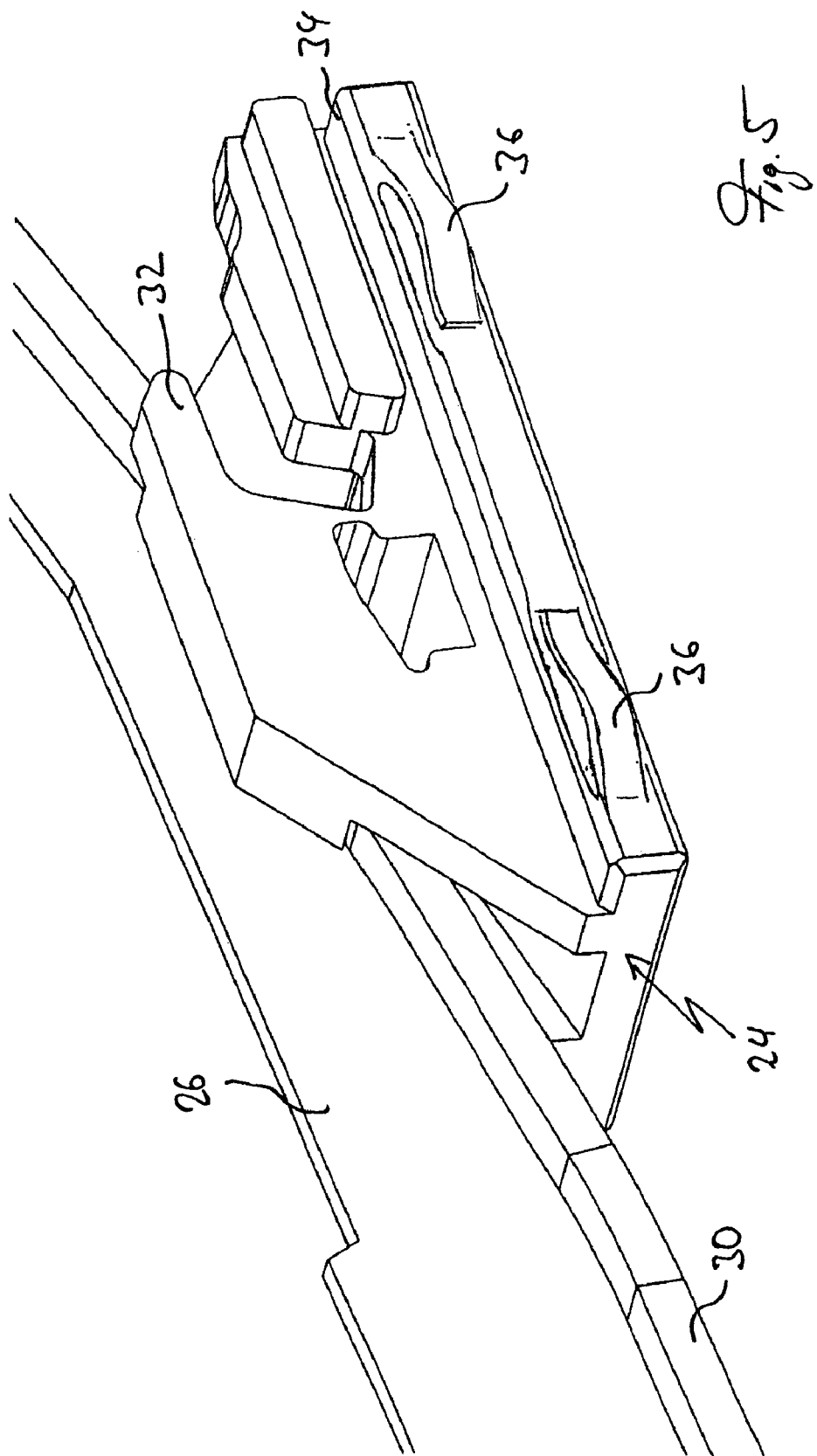
FIG. 5 shows a perspective view of a carriage element of the adjustment device together with a carrier element of the cover element.

The drive carriage 24, which engages with a claw section 32, which optionally forms an upper sliding surface for the guide web 30, around the guide web 30 of the carrier element 26 is a plastic injection molded part which is provided on both sides with a sliding section 34 via which the drive carriage 24 is guided in guide tracks of the relevant guide rail 20. That side of the sliding section 34 which is on the outside with respect to the longitudinal center plane of the drive carriage 24 has spring tabs 36 which are formed integrally, serve to compensate for tolerances in the transverse direction of the vehicle and are illustrated in FIG. 5.

Figure 6:
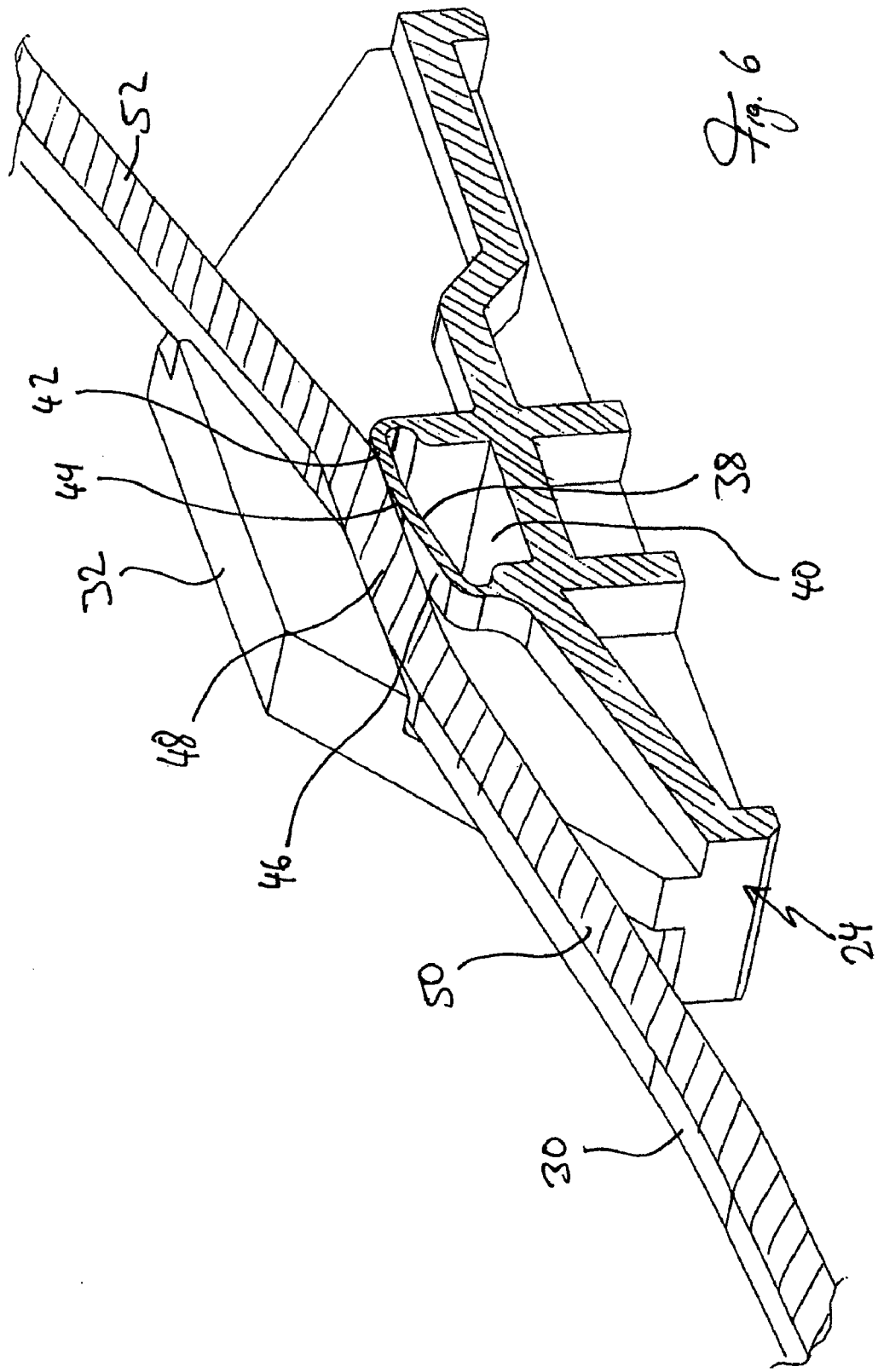
FIG. 6 shows a longitudinal section through the carriage element and the carrier element.
Figure 7:
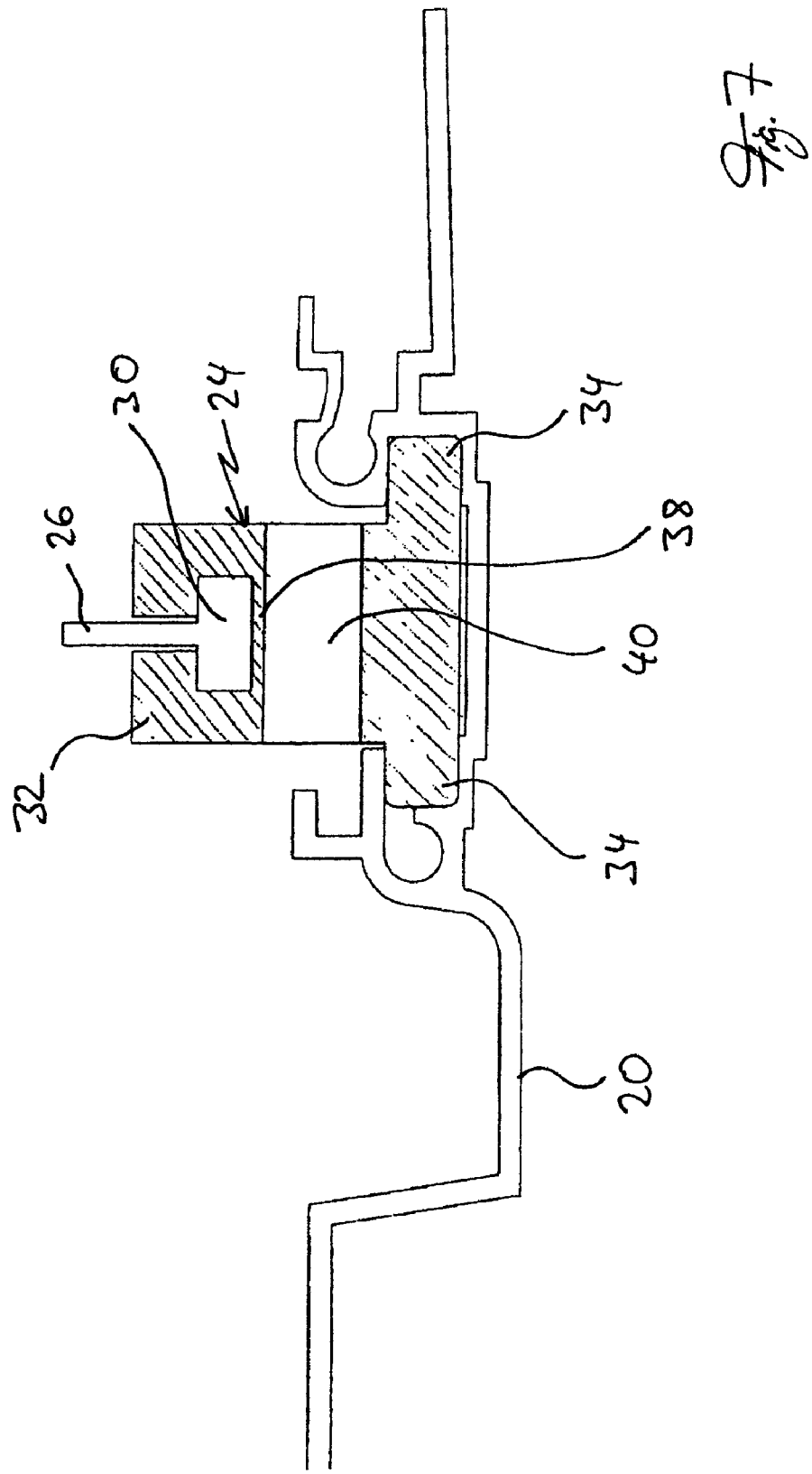
FIG. 7 shows a section in the transverse direction of the vehicle through the adjustment device for the cover element.

As can be gathered from FIG. 6, the drive carriage 24 has a guide section 38 which is formed integrally therewith and forms a lower sliding surface for the guide web 30 and is formed by a wall which bounds the upper side of a cavity 40. The wall forming the guide section 38 is elastically deformable, and therefore the running or active surface of the guide web 30, which surface is arranged on the lower side, is spring-mounted, and therefore tolerances can be absorbed and forces in the vertical direction of the vehicle can be damped.

The drive carriage 24 can be designed as a two-component injection molded part, wherein a first component which forms the guide section 38 and the claw section 32 is designed in an optimized manner with respect to the sliding pairing with the plastic which surrounds the guide web 30 of the carrier element 26.

The guide section 38 is divided into three subregions 42, 44 and 46 which are arranged consecutively in the longitudinal direction of the vehicle, are each inclined in relation to one another and of which the subregion 42 is assigned a section 48 assigned to the closed position of the cover element 12, the subregion 44 is assigned to a section 50 assigned to the ventilation position, and the subregion 46 is assigned to a subregion 52 of the guide web 30 of the carrier element 26, which subregion is assigned to the lowered displacement position. By means of the subregions 42, 44 and 46 which are tilted with respect to one another, optimized contact behavior between the guide section 38, which is formed on the drive carriage 24, and the lower side or active surface of the guide web 30 of the carrier element 26 can be achieved in each pivoting phase of the cover element 12.

Figure 8:
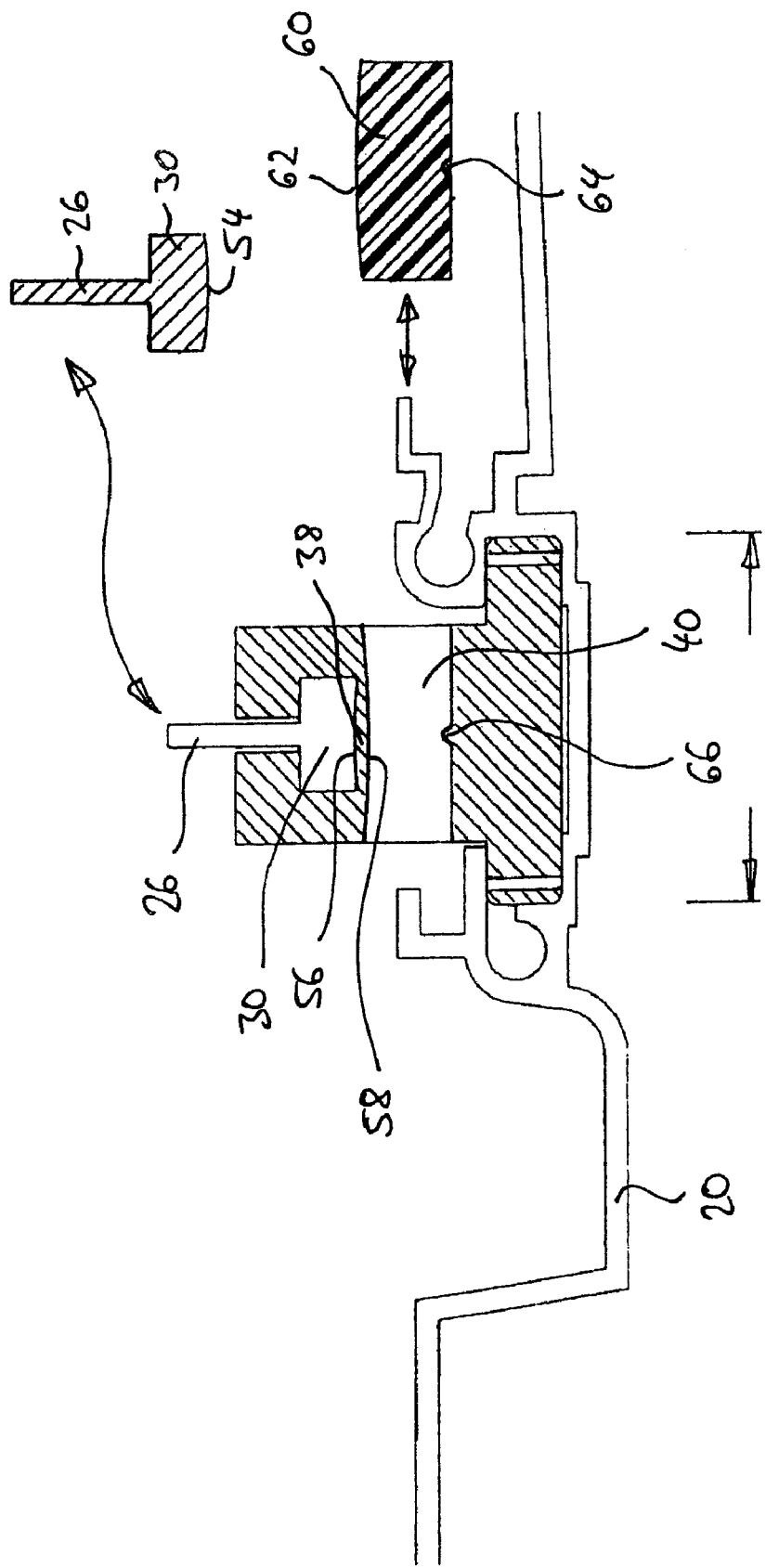
FIG. 8 shows alternative embodiments of the adjustment device.

FIG. 8 illustrates various embodiments for optimizing the prestressing which is exerted on the carrier element 26 by the guide section 38 of the drive carriage 24. Firstly, it is possible to design the active surface 54, which is arranged on the lower side of the carrier element 26, with an arched cross section in the transverse direction of the carrier element 26. Secondly, it is possible, as illustrated in FIG. 8, to design surfaces 56 and 58 which bound the guide section 38 to be curved or arched in the transverse direction of the vehicle. Furthermore, it is possible to insert a damping element 60 into the cavity 40, the upper side 62 of which damping element has a curved cross section in the transverse direction of the guide rail 20, that cross section consequently additionally having an over-arched surface 62 providing prestressing. Depending on requirements, the technically most expedient and cost-effective solution with regard to the prestressing in the vertical direction of the vehicle can be found by appropriate configuration of the above-described curvatures in combination or else in each case on their own.

In order to fix the damping element 60 in the cavity 40, a groove 64 is arranged on the lower side of the damping element 60, said groove running in the longitudinal direction of the vehicle and a web-like projection 66 of the drive carriage 44 engaging in said groove in the installed position.

Figure 9:
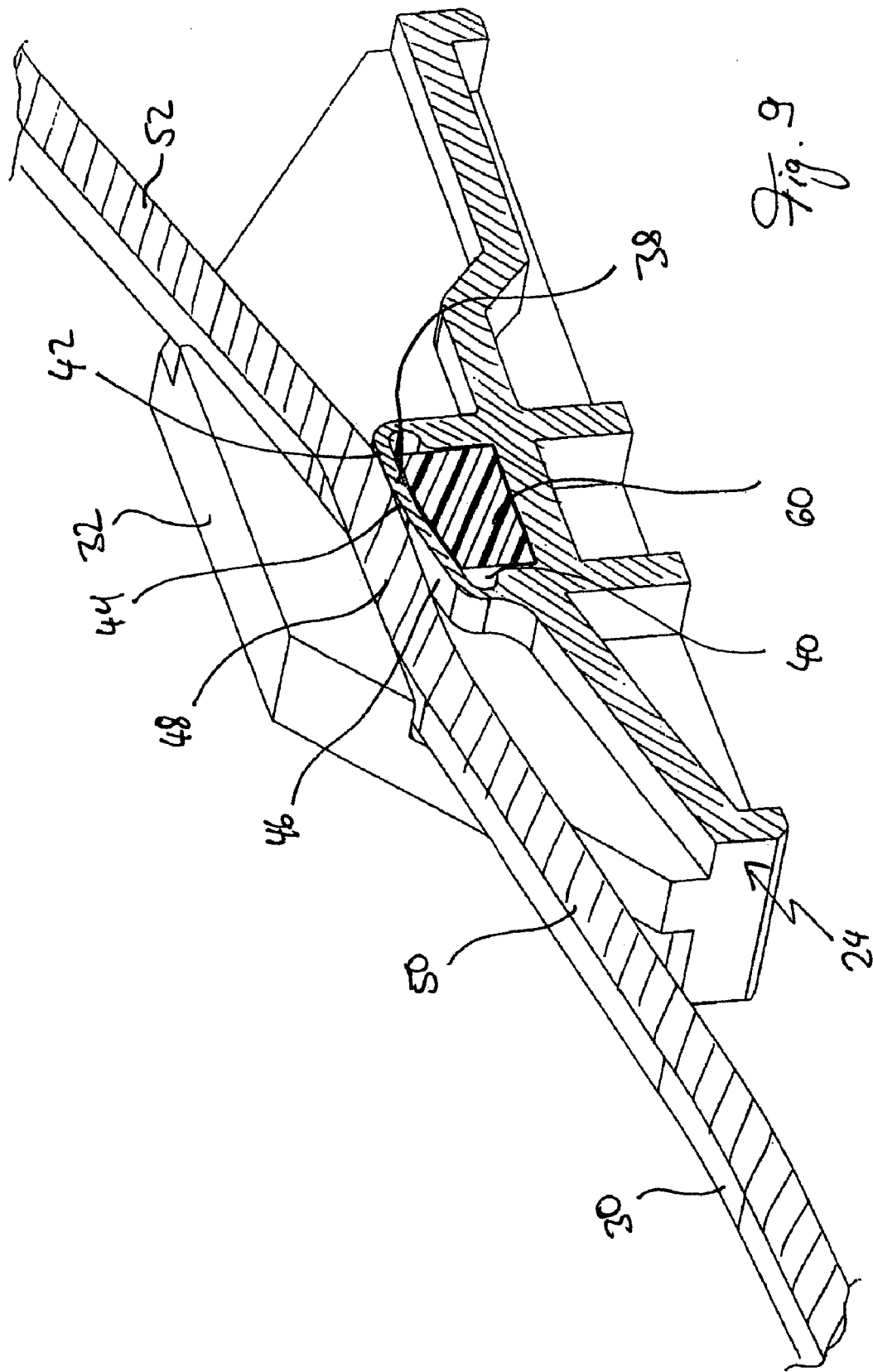
FIG. 9 shows a longitudinal section through a further embodiment of a carriage element with a damping element for forces introduced by the carrier element.

The damping element 60 which consists, for example, of EPDM, TPE, NBR or the like, is illustrated in the installed position thereof, in which it is arranged in the cavity 40, with reference to FIG. 9. As can be gathered from FIG. 9, the wall forming the guide section 38 rests directly on the damping element 60 such that drive forces admitted to the drive carriage 24 by the carrier element 26 can be directly damped.

Figure 10:
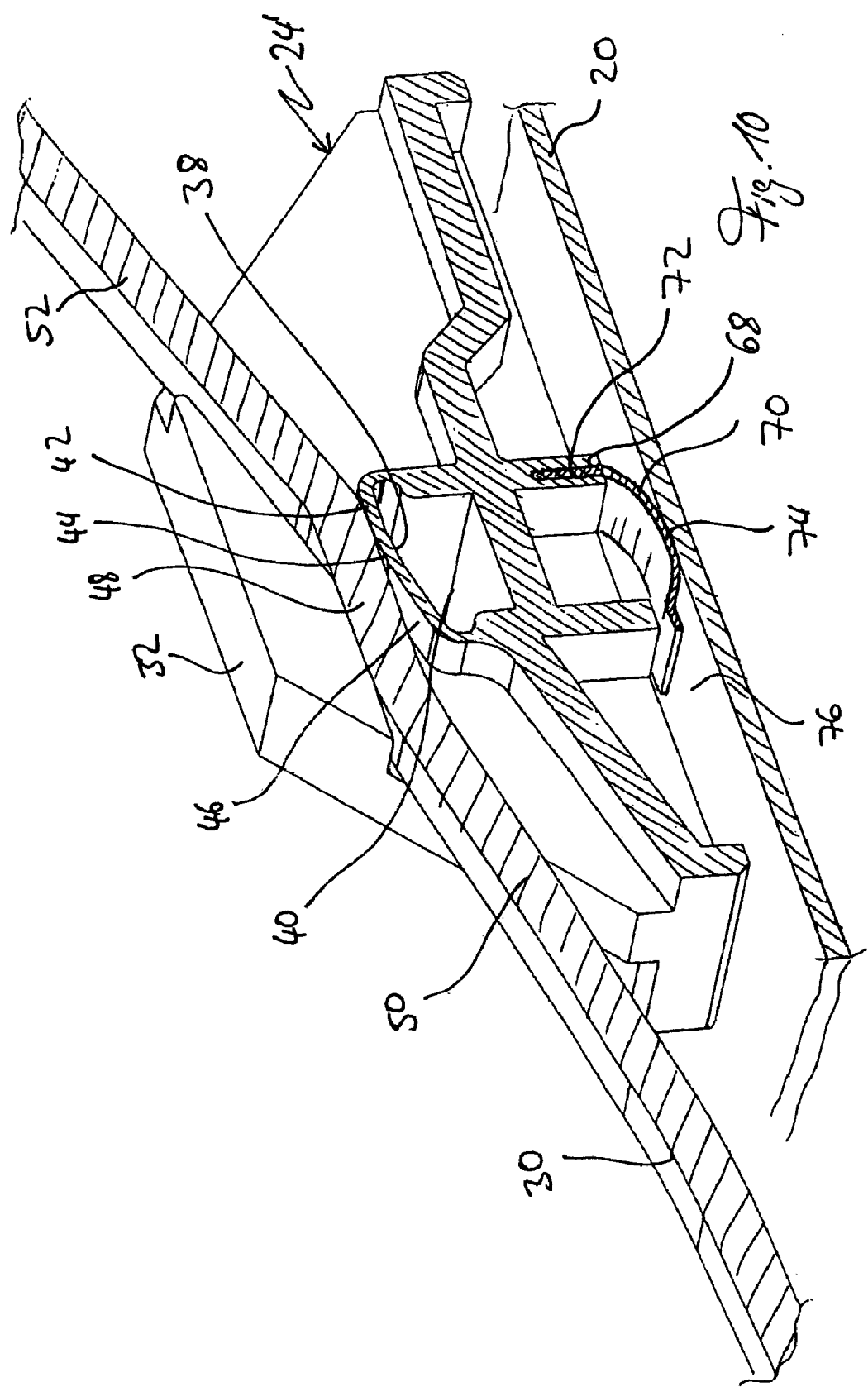
FIG. 10 shows a longitudinal section through a carriage element with a supporting spring on the underside.

The embodiment, which is illustrated in FIG. 10, of a drive carriage 24' corresponds substantially to that according to FIG. 6 but differs therefrom in that the lower side of the drive carriage 24' has a slot 68 into which a leaf spring 70 is inserted via a foot section 72, said leaf spring having a sliding section 74 which is supported on a sliding surface 76 of the guide rail 20. The leaf spring 70 is arranged below the guide section 78 of the drive carriage 24, on which guide section the guide web 30 of the carrier element 26 rests. The sliding surface 76 lies between the guide tracks, which are formed on the guide rail 20, for the sliding sections 34 on both sides of the drive carriage 24'. Forces acting on the drive carriage 24' in the vertical direction of the vehicle can therefore be introduced directly into the guide rail 20.

Figure 11:
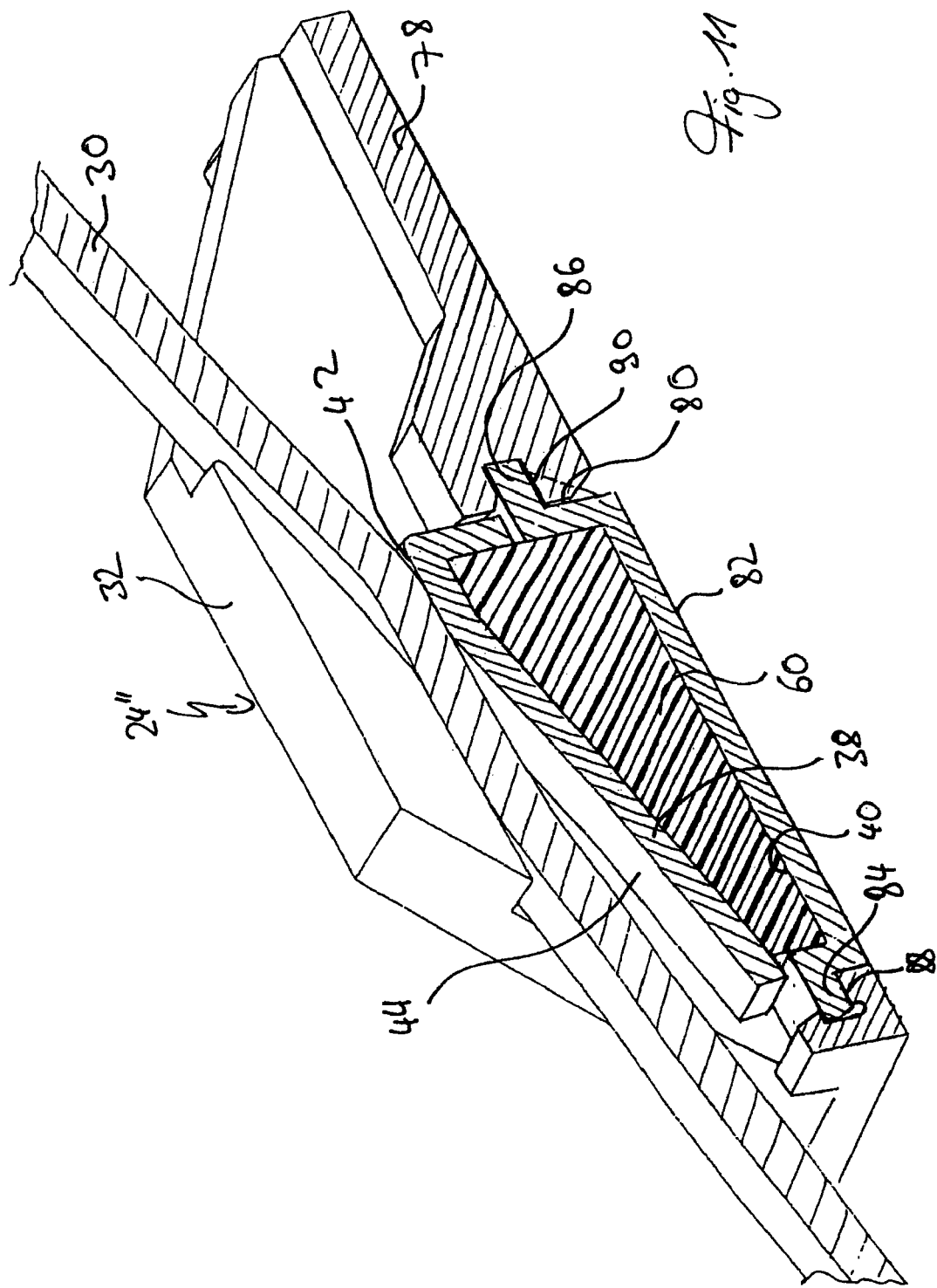
FIG. 11 shows a longitudinal section through a carriage element with an insert forming a guide section.

FIG. 11 illustrates a further embodiment of a drive carriage 24" which differs from the above-described drive carriage in that it is formed from a drive carriage body 78 which is designed as a plastic injection molded part and has a recess 80 into which an insert 82, which is likewise designed as a plastic structural member, is latched via latching lugs 84 and 86 which engage in corresponding recesses 88 and 90 in the drive carriage body 78. The upper boundary wall of the insert 82 forms a guide section 38 for the guide web 30 of the carrier element 26 and has a cavity 40 which is likewise filled by a damping element 60. The function of the guide section 38, which here has two subregions or guide surfaces 42, 44 which are tilted with respect to each other, corresponds to that of the guide section of the above-described exemplary embodiments.

Figure 12:
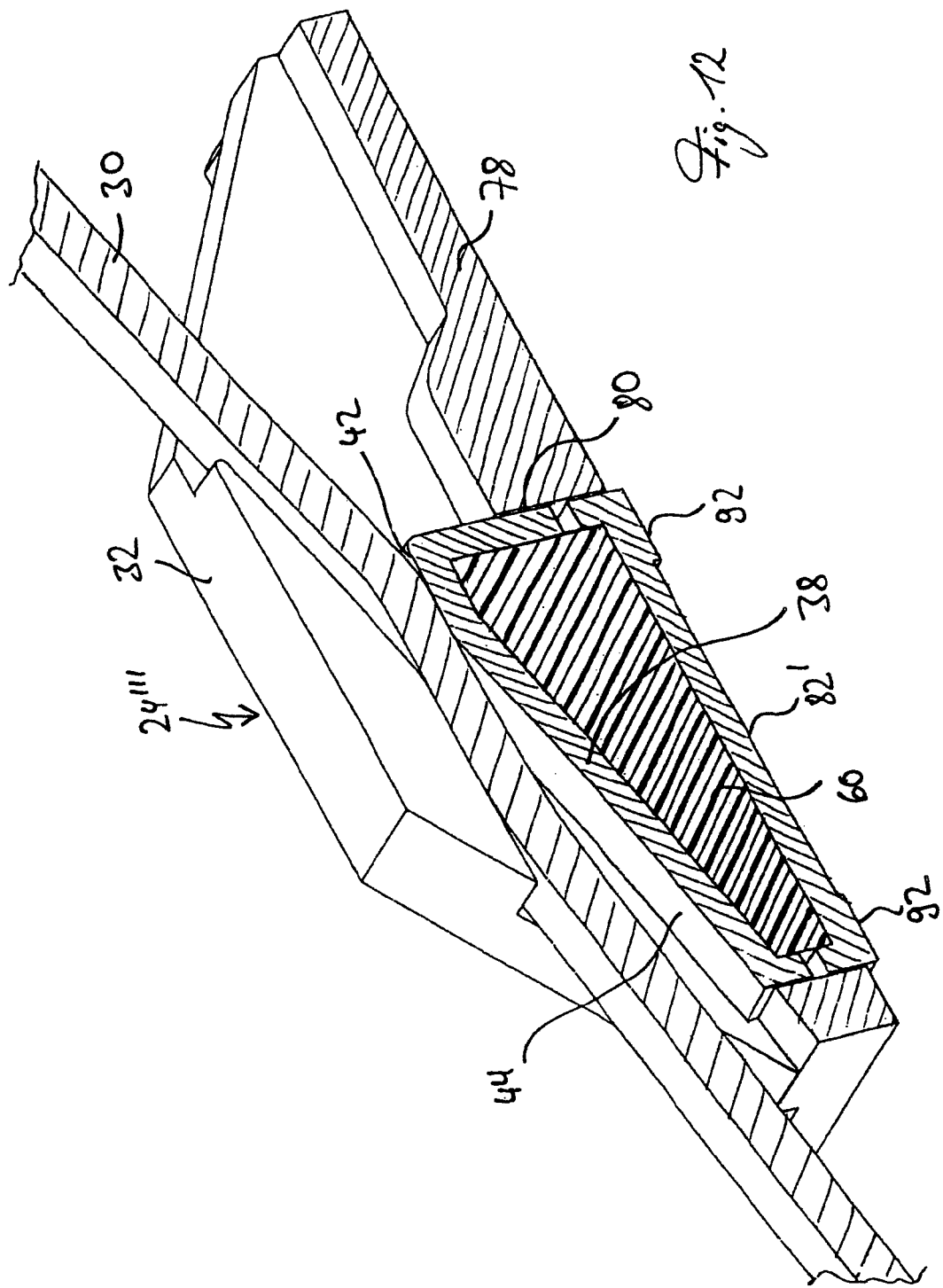
FIG. 12 shows an alternative embodiment of a carriage element with an insert.

FIG. 12 illustrates a further embodiment of a drive carriage, which embodiment substantially corresponds to that according to FIG. 11 but differs therefrom in that the insert 82', which is designed as a plastic structural member, is supported on a sliding surface of the guide rail via base surface regions 92. The insert 82' is guided movably in a recess 80 in the drive carriage body 78 at right angles to the sliding surface of the guide rail. The insert 82' is not fixed in the drive carriage 24".

Figure 13:
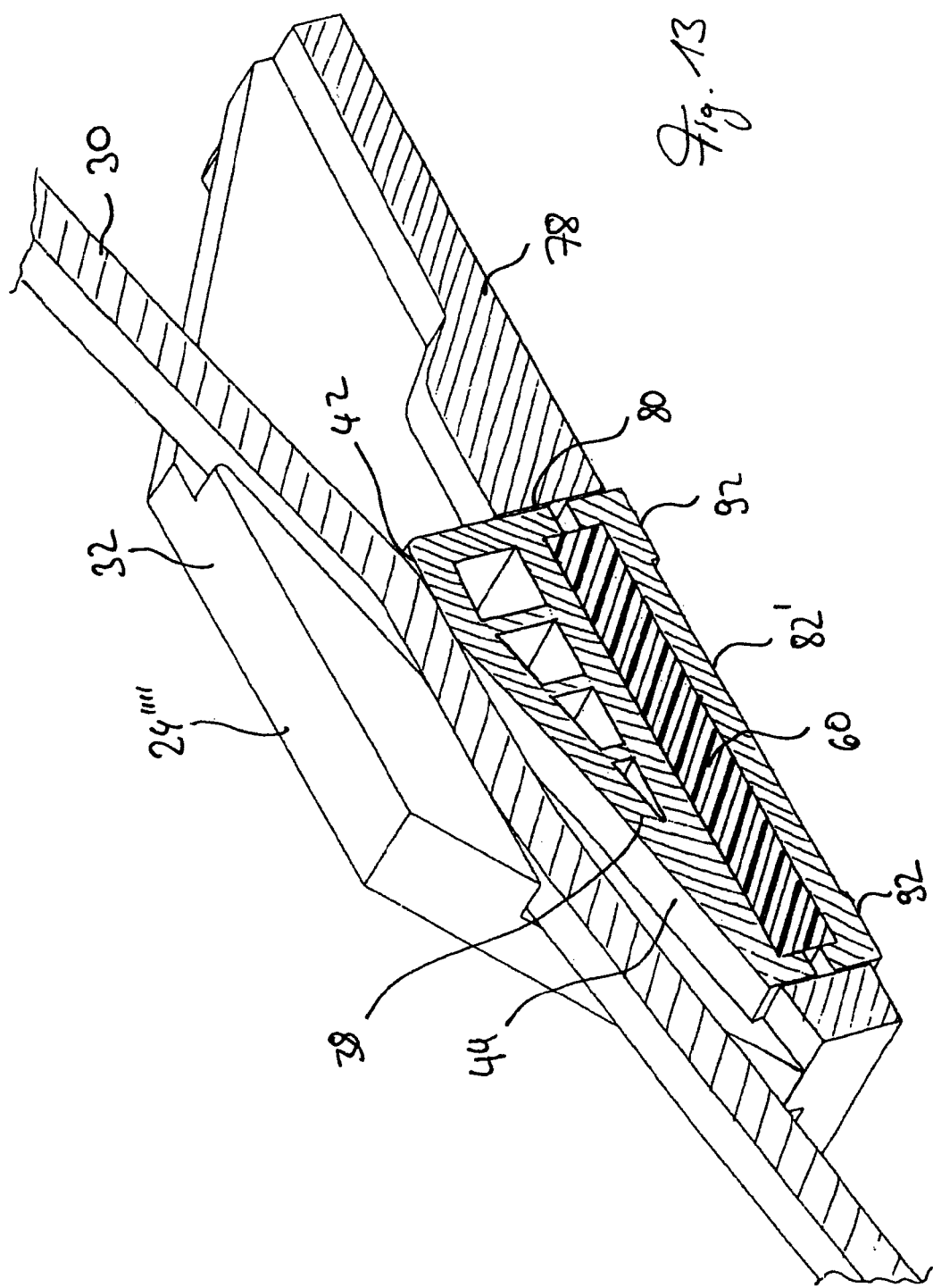
FIG. 13 shows a further alternative embodiment of a carriage element with an insert which forms a guide section for the carrier element.

FIG. 13 illustrates a further embodiment of a drive carriage 24''', the function and manner of operation of which substantially corresponds to those of the above-described exemplary embodiments but differ from the exemplary embodiment according to FIG. 12 in that a wall forming a guide section 38''' is of double-walled design in some regions, and the sub-walls of the double-walled guide section 38''' are connected to one another by webs 94.

Figure 14:
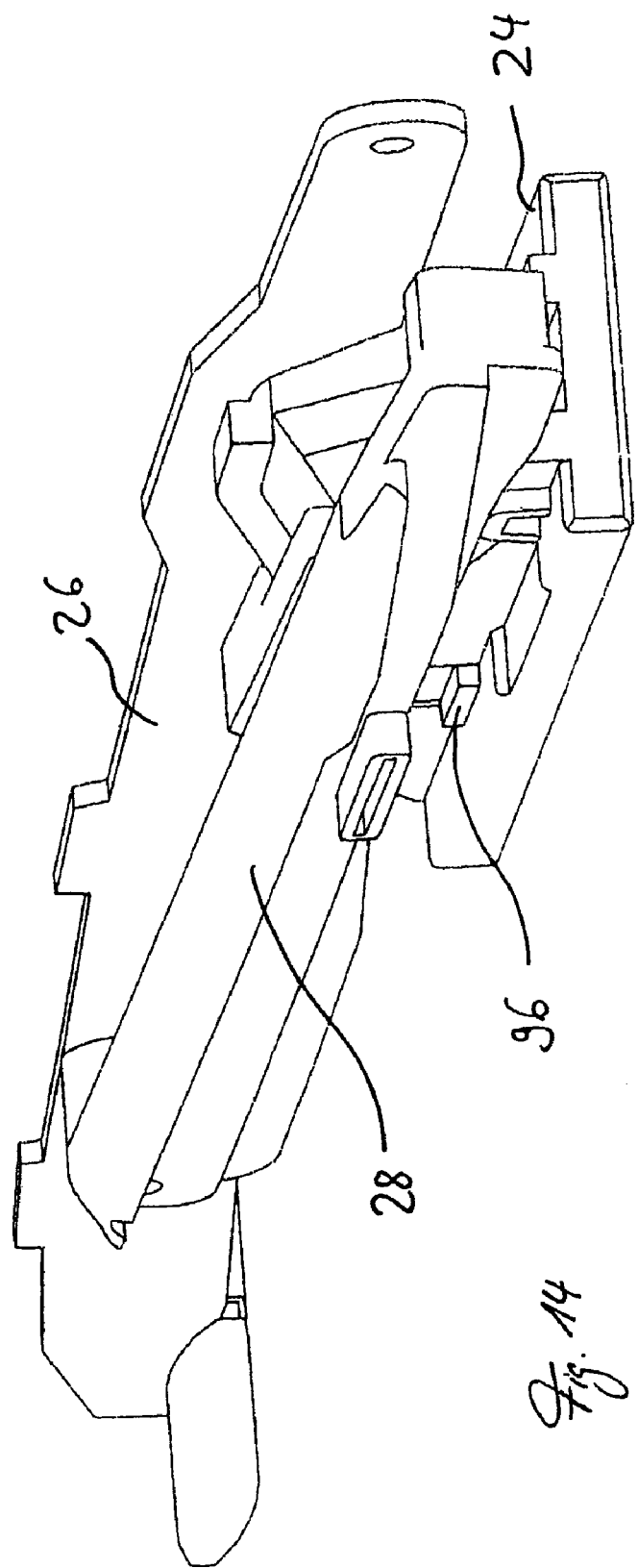
FIG. 14 shows a variant embodiment of the adjustment device for a closed position of the cover element.

FIGS. 14 to 16 illustrate a variant embodiment of an adjustment device 22', which substantially corresponds to that according to FIG. 9 but differs in that the damping element 60 serving as a buffer has a projection 96 which is arranged outside the drive carriage body and on which the locking lever 28 rests in the lowered displacement position of the cover element 12. The locking lever 28 can therefore rest thereon without annoying noises.

| List of reference numbers | |
|---|---|
| 10 | Tilt and slide sun roof |
| 12 | Cover element |
| 14 | Glass body |
| 16 | Frame |
| 18 | Fastening tabs |
| 20 | Guide rail |
| 22 | Adjustment device |
| 24 | Drive carriage |
| 26 | Carrier element |
| 28 | Locking lever |
| 30 | Guide web |
| 32 | Claw section |
| 34 | Sliding section |
| 36 | Spring tabs |
| 38 | Guide section |
| 40 | Cavity |
| 42 | Subregion |
| 44 | Subregion |
| 46 | Subregion |
| 48 | Section |
| 50 | Section |
| 52 | Section |
| 54 | Active surfaces |
| 56 | Surface |
| 58 | Surface |
| 60 | Damping element |
| 62 | Upper side |
| 64 | Groove |
| 66 | Projection |
| 68 | Slot |
| 70 | Leaf spring |
| 72 | Foot section |
| 74 | Sliding section |
| 76 | Sliding surface |
| 78 | Drive carriage body |

-continued

| List of reference numbers | |
|---|---|
| 80 | Recess |
| 82 | Insert |
| 84 | Latching lug |
| 86 | Latching lug |
| 88 | Recess |
| 90 | Recess |
| 92 | Base surface region |
| 94 | Webs |
| 96 | Projection |

The invention claimed is:

1. A vehicle roof with at least one cover element that optionally closes or at least partially opens up a roof opening comprising a carrier element on both sides with respect to a vehicle longitudinal center plane, said carrier element being provided with a guide link and interacting with an adjustment device that is guided in a guide rail arranged in a longitudinal direction of the vehicle and comprises a carriage element that interacts with the guide link of the particular carrier element, at least for pivoting the cover element, and comprises a guide section on which the carrier element rests, wherein the guide section is formed by a wall of a plastic structural member, which wall can yield in an elastically deformable manner into a cavity formed by the plastic structural member, the carriage element is a plastic injected molded part, and the plastic structural member that has the wall forming the guide section is molded integrally with the carriage element.

2. The vehicle roof as claimed in claim 1, wherein the carriage element is a two-component injection molded part, a carriage element body is formed by a first plastic component, and the plastic structural member is formed by a second plastic component.

3. The vehicle roof as claimed in claim 1, wherein an elastically deformable damping element, on which the wall forming the guide section is supported, is arranged in the cavity.

4. The vehicle roof as claimed in claim 3, wherein the side of the damping element that bears against the wall forming the guide section is of curved design transversely with respect to the extent of the guide rail.

5. The vehicle roof as claimed in claim 3, wherein the damping element has a cutout in which a projection of the carriage element engages and which holds the damping element in position.

6. The vehicle roof as claimed in claim 3, wherein the carriage element has laterally an opening for the insertion of the damping element.

7. The vehicle roof as claimed in claim 3, wherein the damping element forms a projection that serves as the rest for a locking lever of the adjustment device.

8. The vehicle roof as claimed in claim 1, wherein the wall forming the guide section is of curved design at least on one side transversely with respect to the extent of the guide rail.

9. The vehicle roof as claimed in claim 1, wherein the guide web of the carrier element has an operative surface that bears against the guide section and is curved in the transverse direction of the carrier element.

10. The vehicle roof as claimed in claim 1, wherein the guide section is formed by at least two guide surfaces each of which forms a subregion and is assigned to a pivoting phase of the cover element, the respective subregions being arranged consecutively in the longitudinal direction of the guide rail.

11. The vehicle roof as claimed in claim 1, wherein the wall forming the guide section is of double-walled design.

12. The vehicle roof as claimed in claim 1, wherein integrally formed spring tabs are arranged on the carriage element and, in assigned guide tracks of the respective guide rail, bear against a guide track wall.

13. A vehicle roof with at least one cover element that optionally closes or at least partially opens up a roof opening comprising a carrier element on both sides with respect to a vehicle longitudinal center plane, said carrier element being provided with a guide link and interacting with an adjustment device that is guided in a guide rail arranged in a longitudinal direction of the vehicle and comprises a carriage element that interacts with the guide link of the particular carrier element, at least for pivoting the cover element, and comprises a guide section on which the carrier element rests, wherein the guide section is formed by a wall of a plastic structural member, which wall can yield in an elastically deformable manner into a cavity formed by the plastic structural member, the carriage element is a plastic injected molded part, the plastic structural member that has the wall forming the guide section is formed integrally with the carriage element, and the plastic structural member is supported with a base surface on the guide rail and is guided at right angles to the base surface in a corresponding recess in the carriage element body.

* * * * *